US012246341B2

(12) United States Patent
Pankoke

(10) Patent No.: US 12,246,341 B2
(45) Date of Patent: Mar. 11, 2025

(54) METHOD AND DEVICE FOR MANUFACTURING A BASE LAYER HAVING DIFFERENT DEGREES OF HARDNESS AND WORKPIECE HAVING DIFFERENT DEGREES OF HARDNESS

(71) Applicant: Hymmen GmbH Maschinen- und Anlagenbau, Bielefeld (DE)

(72) Inventor: René Pankoke, Bielefeld (DE)

(73) Assignee: Hymmen GmbH Maschinen- und Anlagenbau, Bielefeld (DE)

( * ) Notice: Subject to any disclaimer, the term of this patent is extended or adjusted under 35 U.S.C. 154(b) by 214 days.

(21) Appl. No.: 17/630,952

(22) PCT Filed: Sep. 28, 2021

(86) PCT No.: PCT/EP2021/076702
§ 371 (c)(1),
(2) Date: Jan. 28, 2022

(87) PCT Pub. No.: WO2022/064072
PCT Pub. Date: Mar. 31, 2022

(65) Prior Publication Data

US 2022/0355335 A1 Nov. 10, 2022

(30) Foreign Application Priority Data

Sep. 28, 2020 (DE) ..................... 10 2020 212 204.0

(51) Int. Cl.
*B05D 1/32* (2006.01)
*B05D 7/00* (2006.01)
*B41M 7/00* (2006.01)

(52) U.S. Cl.
CPC ............... *B05D 1/32* (2013.01); *B05D 7/532* (2013.01); *B41M 7/0081* (2013.01); *B41M 7/009* (2013.01)

(58) Field of Classification Search
CPC ........ B05D 1/32; B05D 7/532; B41M 7/0081; B41M 7/009
See application file for complete search history.

(56) References Cited

U.S. PATENT DOCUMENTS 6,849,308 B1 * 2/2005 Speakman ........... H05K 3/1208 427/512
2015/0158241 A1 6/2015 Döhring
2016/0200092 A1 7/2016 Dochring
2020/0016627 A1 1/2020 Pankoke

FOREIGN PATENT DOCUMENTS

CN 104364089 2/2015
CN 110076060 8/2019
CN 110267813 9/2019
(Continued)

OTHER PUBLICATIONS

Beuth "Paints and Varnishes—Determination of Gloss Value at 20°, 60° and 85° [ISO 2813:2014]; German Version EN ISO 2813:2014", Beuth, DIN, 2 P., Feb. 2015.
(Continued)

*Primary Examiner* — Kelly M Gambetta

(57) ABSTRACT

A method and a device for manufacturing a base layer (3) having different degrees of hardness is disclosed. Further a workpiece with a base layer (3) manufactured by such method is disclosed.

18 Claims, 10 Drawing Sheets

(56) References Cited

FOREIGN PATENT DOCUMENTS

| | | | | |
|---|---|---|---|---|
| CN | 110290925 | | 9/2019 | |
| EP | 3109056 | | 12/2016 | |
| EP | 3109056 | A1 * | 12/2016 | ............ B41M 3/008 |
| EP | 3415316 | | 12/2018 | |
| EP | 3415316 | A1 * | 12/2018 | ............. B05D 3/002 |
| WO | WO 2010/070485 | | 6/2010 | |
| WO | WO 2014/011110 | | 1/2014 | |
| WO | WO 2020/039361 | | 2/2020 | |

OTHER PUBLICATIONS

Notification of Office Action and Search Report Dated Sep. 23, 2023 From The State Intellectual Property Office of the People's Republic of China Re. Application No. 202180010977.X and Its Translation Into English. (32 Pages).

* cited by examiner

[Cross-section measurement of a coating pore according to the "prior art"
- with edge bulging
- non-sharped-edged]

[Cross-section measurement of a coating pore according to the inventive method, i.e.: without edge bulging ⊕ non-sharped-edged.]

METHOD AND DEVICE FOR MANUFACTURING A BASE LAYER HAVING DIFFERENT DEGREES OF HARDNESS AND WORKPIECE HAVING DIFFERENT DEGREES OF HARDNESS

RELATED APPLICATIONS

This application is a National Phase of PCT Patent Application No. PCT/EP2021/076702 having International filing date of Sep. 28, 2021, which claims the benefit of priority of German Patent Application No. 10 2020 212 204 filed on Sep. 28, 2020. The contents of the above applications are all incorporated by reference as if fully set forth herein in their entirety.

The present invention relates to a method and a device for manufacturing a base layer having different degrees of hardness and to a workpiece having different degrees of hardness.

Furthermore, a workpiece with a decorative printed surface and a corresponding optically visible haptic sensible structure may be produced, and a method and a device for manufacturing such workpieces is described. There have been many developments on this subject in recent years. However, there are still open problems with regard to the desired sharpness and the optical and haptic depth of such structures, which are solved with here present inventive method and the inventive panel.

For manufacturing decorative surfaces on an industrial scale, which have, for example, the objective of the reproduction of tile or wood surfaces, in addition to a layer that forms the later surface, other manipulation agents are also temporarily applied to manipulate the surface of the layer so that the decorative surface can finally be produced.

EP 3 109 056 A1 describes, for example, a method for manufacturing a structure on a surface. Therefore, a liquid layer is applied on a workpiece. Subsequently, a manipulation agent in the form of droplets is sprayed on the liquid layer, wherein a displacement of the liquid layer by the droplets takes place such that depressions are formed therein, which together form a structure in the liquid layer. This layer is subsequently fixed. In this manner, a surface on the layer can be produced that provides a wood or tile optic.

EP 3 415 316 A1 discloses a method, at which a manipulation agent is applied on the liquid layer in form of droplets or fine droplets, wherein the manipulation agent provides the property to absorb electromagnetic radiation at least partially. By irradiation the liquid layer, for example, with an excimer laser, a polymerization at the surface of the liquid layer takes place causing micro folding there, which later results in a matte surface. The manipulation agent on the surface of the liquid layer absorbs the radiation at least partially, so that the polymerization of the underlying layer takes place to a lesser extent in these areas. These areas are less glossy as a result. Here, too, the manipulation agent can be used to introduce depressions into the liquid layer.

However, all of the above mentioned methods and the workpieces produced therewith showing the following significant disadvantage: The structures produced therewith are not sufficiently sharp-edged. Thereby, according to the present invention, the term "sharp-edged" is to be understood as follows (cf. FIGS. 4 to 6): A substantially transparent base layer 3 above a, for example, digitally printed decorative layer having an average layer thickness d (cf. FIG. 4) comprises a depression 6, for example, the reproduction of a wood pore. Thereby, the acute angle between a horizontal tangent at the bottom of the depression, i.e. the deepest position of the depression 6, and a tangent at the wall of the depression 6 shall be designated as internal angle β. A depression with a specifically large internal angle β of, for example, more than 60 degrees, in particular more than 80 degrees, is in terms of the present invention designated as "sharp-edged", while, in turn, a depression with a smaller edge or internal angle, respectively, of, for example, merely 30 degrees or less is designated as "not sharp-edged" (cf. FIGS. 4*a* to *c* in total).

The tangent is thereby advantageously to be applied to the wall of the depression 6 in the upper half of the depression 6, i.e. along the first half of the distance from the opening to the bottom of the depression 6. If the depression 6 is designed as a through hole, the tangent is to be applied in one half of the connection of both openings of the depression. Since a horizontal tangent to the bottom of the depression cannot be applied here, a line perpendicular to the axis of the through hole or parallel to the surface of the base layer may be applied instead.

By this definition, however, it is not excluded to also apply tangents in the lower half of the depression 6.

In addition, structures produced according to the prior art exhibit an edge curvature, in which an increase in the layer thickness on the surface or an increase in the thickness of the entire workpiece is visible around the pores of the structures (by this is meant the depressions), in particular in the range of 1 mm to 3 mm (cf. FIG. 5*a, b*). This edge bulge, which is present in the prior art, is also undesirable because it reduces the visual and haptic impression of the "depth" of a structure, and stands out negatively from a genuine wood pore. Therefore, the present invention is intended to disclose a method and a panel to avoid this edge bulging. With regard to the prior art, cf. the measurements carried out on samples produced according to the prior art (cf. FIG. 8*a*).

Furthermore, the known digital methods provide the disadvantage that the base layer 3 is not or at least not completely removed by a further post-processing, cf. hereto, for example, WO 2020/020039 A1. In this document, according to the procedure presented there, only the "Liquid B" mentioned there is removed again after irradiation, but not the "Liquid A". This leads to the already mentioned disadvantages of a lower "sharpness" and a lower optical and haptic depth. From the incomplete removal of the base layer 3 at the positions of the depressions 6, an additional disadvantage results in that it becomes impossible to create an optically visible difference in a degree of gloss between the "bottom" of the depression 6 and the top layer on the workpiece, since, if not completely removed, the "bottom" of the depression 6 consists of the same coating material as the top layer of the base layer 3. According to the prior art, there is at best a possibility of influencing the degree of gloss of the surface by an additional layer above the base layer 3, as shown, for example, in FIG. 6 with the base coat 9 indicated there. However, this has the disadvantage that an additional coating layer has to be applied, which is associated with significant additional costs for material and equipment investment. In addition, it may lead to the top base coat 9 also penetrating into the depressions, thus canceling out the desired difference in the degree of gloss.

Degrees of gloss are specified below in accordance with the gloss measurement according to DIN EN ISO 2813:2015-02. For the gloss measurement, the amount of light reflected by a surface in relation to a reference standard of polished glass is measured. The unit of measurement used is GU (gloss units). The amount of light reflected at the surface depends on the angle of incidence and the properties of the surface. Different angles of incidence (20°, 60° and 85°) can be used in the gloss measurement to record the degree of reflection, wherein the angle of incidence of 60° preferably being used for measurement. Alternatively, the average of measurements at the three angles of incidence may be used. The degree of reflection compares the light energy emitted and received by a gloss meter as a percentage at a given angle of incidence.

Desired, but not achievable by the prior art, are, for example, structures with a degree of gloss of 8-15 GU at the surface and 2 to 6 GU at the bottom of the pores.

Alternatively, according to the present invention, a panel may also be produced with a degree of 2-8 GU, preferably 2-6 GU, at the surface and 8-15 GU, preferably 10-12 GU, at the bottom of the pores.

With the production method according to the prior art and the small internal angles, i.e. the "not sharped-edged pores", achieved thereby, the result is therefore both visually and haptically the impression of a very flat, i.e. shallow, structure. To the observer, such a structure produced according to the prior art appears, for example, to have a depth of only 20 μm, although a depth structure of 70 μm is measurably present.

Accordingly, it is an object of the present invention to solve at least one of the above mentioned problems.

The object is solved by the subject-matter of the independent claims. Advantageous modifications are subject to the dependent claims.

It has been proven as advantageous to prepare the base layer for generating sharp-edged depressions in such a manner that different degrees of hardness in the base layer are produced area by area. This is carried out by selective curing of the base layer. Preferably, areas of the base layer with a lower degree of hardness are then removed by a subsequent processing step. The removal may be carried out, for example, physically and/or chemically.

However, applications are also conceivable in which less cured areas remain in the base layer.

The base layer may thereby represent a final product that comprises depressions and/or has areas with different degrees of hardness. Alternatively, the base layer may also be further processed in a subsequent production procedure, for example, by carrying out further surface treatment, adding or removing of material and the like. The subsequent production procedure may follow directly, for example, on one and the same production line after the production of the base layer with different degrees of hardness, or it may be carried out at a later point in time, wherein the base layer with different degrees of hardness is initially present as an intermediate product.

In the following, the term "electromagnetic radiation" is used. If this is not specified in more detail, it can be understood to mean UV radiation and/or IR radiation in particular. However, this is not intended to exclude other radiation ranges or types of radiation, respectively.

Preferably a method, in particular for manufacturing of areas providing different degrees of hardness in a base layer, is therefore provided having the following steps:

applying a masking on at least a partial area of the surface of the base layer, wherein the masking is configured to at least partially absorb electromagnetic radiation; and irradiating the base layer and the applied masking with electromagnetic radiation, in particular with UV radiation and/or IR radiation, to set different degrees of hardness of the base layer.

The electromagnetic radiation may cause a reduction of the degree of hardness of the base layer as well as an increase in the degree of hardness of the base layer.

The masking serves in particular to influence the base layer below the partial areas less strongly by the radiation by absorbing the electromagnetic radiation. Thus, in particular, the degree of hardness of the base layer is less strongly influenced by the electromagnetic radiation below the masking compared to the areas of the base layer that are not covered by the masking.

Preferably, the masking is configured to absorb electromagnetic radiation of a specific wavelength or a specific range of wavelengths, respectively. This is advantageously selected such that the effect of the electromagnetic radiation, with which the irradiation is carried out, on the base layer below the masking is mitigated. However, the masking may also designed such that it absorbs the radiation completely at specific wavelengths or ranges of wavelengths.

Preferably, a difference in the curing and/or polymerization of the base layer exists between the areas, on which the masking has been applied, and the areas, on which the masking has not been applied, after the irradiation of the base layer and the applied masking by electromagnetic radiation, in particular by UV radiation and/or IR radiation to set the different degrees of hardness of the base layer, wherein the difference in curing preferably corresponds at least to a factor of 2, more preferably to at least a factor of 3.

Preferably, the hardness degree gradient in x-direction between the highest degree of hardness and the lowest degree of hardness is set within a length whose extent corresponds to one of the following ranges:

less than 1 mm,
less than 0.1 mm,
less than 100 μm,
less than 10 μm,
less than 1 μm.

The highest degree of hardness is preferably 1. The lowest degree of hardness is preferably 0.

The hardness may be determined, for example, according to the method for determining pendulum hardness according to Konig (DIN 53 157). Thereby, a pendulum is set swinging pulse-free on the surface to be tested at a deflection of 6°. The number of pendulum oscillations is then recorded which the pendulum requires in free oscillation in order to be damped from the original deflection of 6° to a target deflection of 3°.

A hard area is characterized by the pendulum requiring at least eight oscillations to reach the target deflection. A soft or uncured area is characterized by the pendulum requiring at least one oscillation to achieve the target deflection. A soft area is characterized in comparison to a hard area by the fact that it allows fewer pendulum oscillations than the hard area during the above measurement.

Here, a direction in parallel to the surface of the base layer may be understood as x-direction. Thereby, the respective hardness degree gradient on this length starting from an unmasked position towards a masked position is considered. The shorter the length within which the degree of hardness changes from its maximum value to its lowest value, the sharper the interface between the areas with different degrees of hardness.

Preferably, at least a portion of the base layer or the entire base layer is liquid or at least not already completely cured when applying the masking. Preferably, the density and/or surface tension of the base layer and the masking are tailored to each other such that the masking substantially remains on the surface of the base layer. Further, to make the base layer more supportable for the masking, a first curing of the base layer may be carried out before applying the masking, wherein the base layer is not completely cured but respectively hardened to support the masking in a desired manner. The curing may be carried out, for example, by drying and/or by irradiation with electromagnetic radiation, in particular with UV radiation.

Preferably, the base layer and the masking are complementary to each other such that, in particular when carrying out the irradiation of the base layer and the masking, an edge angle between the base layer and the masking is set, which is preferably more than 20 degrees, more preferably more than 50 degrees, in particular more than 70 degrees. This situation may be preferably additionally improved, if, before the application of the masking on the base layer, said base layer is already "gelled" by electromagnetic radiation of a low dose rate, ideally with a very low dose and under inert conditions. Thereby, the base layer may only be initially cured in its surface, i.e. preferably in the range of less than 50% of its thickness, more preferably less than 20%, more preferably less than 5% of its thickness.

Preferably, the mutual irradiation of the base layer and the masking is then carried out subsequently to set the different degrees of hardness of the base layer. In the cross-section or side view of the base layer and masking, the edge angle is understood to be the acute angle between the surface of the base layer and a tangent to the outer edge of the masking at the position, where the edge of the masking abuts the surface of the base layer. If the base layer is not flat, a tangent to the base layer is also applied at this position, with the edge angle then being formed as an acute angle between the two tangents.

However, the following definition may also be used here, according to which the edge angle is the acute angle between a tangent to the outer edge of the masking at the position, where the edge of the masking abuts the surface of the base layer, and a plane perpendicular to the emission direction of the radiation. In this way, an edge angle is defined which, the larger it is, is a measure of how good the separation between masked and unmasked areas is. There is then a separation of the radiation input into the base layer between masked and unmasked areas that is as sharp as possible.

Alternatively or in addition, and preferably when the irradiation of the base layer is carried out to set the different degrees of hardness of the base layer, the height of the masking at the edge of the masking is at least 50%, preferably at least 70%, more preferably at least 90%, of the height of the masking at the center of the masking. Ideally, the shape of the cross-section of the masking approximating a rectangle, wherein the radiation at each position impinges on a masking of equal thickness.

By having the largest possible edge angle of the masking or by forming a masking whose thickness at the edge corresponds as closely as possible to the thickness in the center of the masking, it is advantageously achieved that the areas of the base layer that lie below the masking are protected as uniformly as possible over the entire masked area against irradiation with electromagnetic radiation. This may be explained by the fact that sufficient masking material is also present at the edge of the masking, whereby a similarly high amount of radiation can be absorbed compared to the center of the masking. Areas that have no masking, on the other hand, are irradiated with the full radiation up to the edge of the masking.

The center may be defined as follows. If the applied masking is cut in such a way that the cutting plane is oriented perpendicular to the surface of the base layer located under the masking, the result is a cross-sectional area of the masking with a right and a left end, each defined by the edge of the masking. The extension of the cross-sectional area from right to left is thus defined by the two ends and the edge, respectively, accordingly. The center is then, in particular, a point that bisects the distance between the right and left ends. Alternatively to this definition, the center may also be defined as an area extending to either side of the point bisecting the distance. Preferably, the area extends in total over 10% of the distance between the right and left ends, wherein the height of the masking considered for this purpose is considered to be the average value of the height profile of the masking over the corresponding area.

By an irradiation from above onto a base layer running from left to right, which has a masking on its surface area by area, a sharp boundary of the radiation input into the base layer between masked and unmasked areas may thus be achieved from left to right.

In this way, it is possible to achieve areas in the base layer that have different degrees of hardness, with these areas being sharply separated from one another. With the base coat running from left to right, a step-like progression of the degrees of hardness from left to right thus occurs at the transitions of the individual areas.

Preferably, a further step is performed, in which the base layer is applied on a, in particular plate-like or web-like, carrier element and/or on a further layer, in particular on a coating layer, and/or wherein a, in particular plate-like or web-like, carrier element and/or on a further layer, in particular on a coating layer, is applied on the base layer. The carrier element preferably comprises wood or wood fibers. However, it may also comprise plastic or metal. The base layer may be liquid and/or only partially solidified or already present as a finished, in particular solidified, component when it is applied on the carrier element. The coating layer and/or the further layer may be disposed on a carrier element.

In this way, a workpiece, in particular a panel, may be manufactured which comprises the base layer. Such a workpiece may function in particular as a functional and/or decorative component, for example, as a floor covering, as a wall covering or as a component for furniture.

Preferably, the masking on the surface of the base layer, in particular when irradiating the base layer to set the different degrees of hardness of the base layer, is present in liquid form. Alternatively, in particular during or before irradiating the base layer to set the different degrees of hardness of the base layer, the masking is at least partially, preferably completely, solidified. It may also be provided that parts of the masking are solidified to, for example, remain on the base layer so that they form part of the final workpiece. Other parts of the masking may, on the other hand, be present in liquid form or not fully cured to remove them again from the base layer.

Preferably, the material forming the masking is applied in liquid form and/or in gaseous form on the surface of the liquid base layer, wherein preferably, when applying the material in gaseous form, a condensation of the material to the masking on the surface of the base layer takes place. For this purpose, condensation nuclei, for example in powder form or by electrostatic charging of the base layer, may be provided on the surface of the base layer or by a further applied liquid, which are formed or applied, for example, in a preceding process step. These cause the material forming the masking to liquefy at the condensation nuclei and form the masking there. When applying the material forming the masking in liquid form, digital and/or analog printing technology may preferably be used.

Preferably, the material forming the masking, in particular when using digital printing technology, is applied on the base layer in the form of at least one droplet. The at least one droplet has preferably a volume that corresponds to one of the following limits:

less than 2 nL,
preferably less than 1 nL,
more preferably less than 400 pL,
more preferably less than 200 pL,
even more preferably less than 50 pL,
even more preferably less than 40 pL.

The droplets may thereby function individually as masking on the surface of the base layer. However, several droplets may also merge to cover a larger area. It may be provided that the volume of individual droplets is varied, i.e. the volume of each individual droplet is adjusted as required. However, by specifically controlling the droplet delivery, it may also be possible for droplets to merge with each other before hitting the base layer in order to place a larger amount of masking material on an area of the base layer. If the droplet size is varied, the individual droplets preferably meet at least one of the volume limits listed above. If a larger area is to be masked, the droplet volume of the dispensed droplets may be varied toward larger volumes to cover a relatively large area, whereas if a relatively fine area is to be masked, the droplet volume may be reduced accordingly.

Preferably, before and/or during applying the masking a step is performed, in which the base layer is irradiated with electromagnetic radiation, in particular UV radiation and/or IR radiation, whereby preferably the degree of hardness and/or the viscosity of the base layer is set to a desired value. In this manner supporting capacity of the base layer for the masking may be influenced. The irradiation is preferably carried out immediately before and/or during applying the masking.

Preferably, a viscosity gradient or a hardness gradient is thereby developed such that the side of the base layer facing away from the radiation source of the electromagnetic radiation provides a viscosity or hardness less, preferably by a factor of at least 4, than the side of the base layer facing towards the radiation source.

Preferably, the layer thickness of the liquid base layer at positions, at which the masking, in particular in the form of droplets, is applied, is reduced, wherein the reduction is preferably less than 10 μm, more preferably less than 1 μm, wherein the reduction of the layer thickness is in particular carried out by sinking of the masking into the base layer and/or by displacement of the base layer by the masking.

The result here is preferably the formation of depressions in the base layer, which are initially filled with the material of the masking. These depressions may be formed by different mechanisms, which may be used exclusively or in combination in the formation of a depression.

For example, such a depression may be formed by the physical impulse that the masking material, particularly as droplets, delivers to the base layer. Another mechanism causes the formation of the depression solely by the weight force of the masking material, whereby it sinks into the base layer. Physical and/or chemical mechanisms may also act by using a material for masking that is immiscible with the one of the base layer.

Such a depression forms a starting point for subsequent removal of parts of the base layer at the masked location.

In an alternative embodiment, the masking may also be applied without the formation of depressions, or with depressions of less than 1 μm relative to the surface of the liquid base layer. This is preferably the case if the liquid base layer has already been pretreated by irradiation with electromagnetic radiation of a lower dose than it would be required for complete curing before the masking is applied.

Preferably, the surface tension of the material forming the masking is equal to or more than the surface tension of the base layer. In this way, it is achieved that the masking on the surface of the base layer curves strongly at the edges so that the largest possible edge angle is formed and/or so that a thickness of the masking is also formed at the edge of the masking, which deviates from the thickness of the masking in its center by a maximum of 50%.

Preferably, after the base layer and the applied masking have been irradiated with electromagnetic radiation, in particular with UV radiation and/or IR radiation, to set the different degrees of hardness of the base layer, a step is carried out, in which the masking is removed or in which the masking and the base layer are removed at positions, where the masking was applied, or in which only material of the base layer is removed.

In particular, the material of the base layer that is located underneath the masking and that was previously shielded from electromagnetic radiation by the masking is removed. Preferably, at least 80% of the layer thickness of the base layer is removed. More preferably, the base layer is completely removed at the location below the masking. This is preferably performed if the material of the base layer underneath the masking is softer compared to the rest of the base layer.

If, instead, softening of the base layer by the electromagnetic radiation has been prevented or reduced at the positions where the masking is applied on the base layer, the unmasked portion of the base layer has a lower degree of hardness, so that material is now preferably removed from this area of the base layer.

The removal of the material of the base layer results in depressions and/or through holes being formed in the base layer at these positions, wherein the removal of the masking or the removal of the masking and the base layer or the exclusive removal of material of the base layer is preferably carried out physically and/or chemically. In particular, brushing and/or grinding may be mentioned as physical removal, which may be supported by suction. Alternatively or in addition, physical removal by suction is also conceivable, in particular solely or exclusively by suction. Chemical removal may be realized in particular by etching.

If a brush or, alternatively or additionally, a grinding or planing element is used to remove the material of the base layer, the base layer and/or the masking is treated by means of electromagnetic radiation or its hardness or viscosity is adjusted such that the brush, the grinding element and/or the planing element does not become clogged with dissolved material of the base layer and/or the masking. It is therefore avoided that the brush, the grinding element and/or the planing element have to be cleaned during the production of the workpieces. Preferably, the irradiation takes place immediately before and/or during the removal.

The resulting depressions form a structuring in the base layer. This may be solely decorative and/or also have technical functionality. For example, when the base layer is used as a floor covering with a wood look, the structuring may run synchronously with the wood fibers depicted, while at the same time a certain slip resistance is achieved by the structuring.

Due to the sharp separation between the individual areas with different degrees of hardness, the depressions may be formed very sharp-edged, as described at the beginning.

Preferably, after the base layer and the applied masking have been irradiated with electromagnetic radiation, in particular with UV radiation and/or IR radiation, to set the different degrees of hardness of the base layer, a step is carried out, in which a further layer comprising a base coat is applied.

Preferably, after the base layer and the applied masking have been irradiated with electromagnetic radiation, in particular with UV radiation and/or IR radiation, to set the different degrees of hardness of the base layer, a step is carried out, in which the entire layer structure is irradiated with electromagnetic radiation, in particular with UV radiation. In this way, complete curing of all components may be achieved.

Preferably, the masking is configured to absorb electromagnetic radiation, with which the base layer and the applied masking are irradiated to set the different degrees of hardness of the base layer, by at least 60%, preferably by at least 80%, more preferably completely.

Preferably, the masking is configured to absorb electromagnetic radiation whose wavelength falls below a threshold wavelength, wherein the threshold wavelength is preferably 380 nm, more preferably 315 nm, in particular 280 nm.

Preferably, the irradiation with electromagnetic radiation to set the different degrees of hardness of the base layer is carried out with radiation, whose wavelength falls below the threshold wavelength. The radiation preferably has a wavelength of less than 380 nm, more preferably of less than 315 nm, in particular of less than 280 nm. Alternatively, the radiation has its emission maximum at a wavelength of less than 380 nm, more preferably of less than 315 nm, in particular of less than 280 nm, but in each case still, in particular smaller, fractions of the emission spectrum above the respective wavelength.

Preferably, the masking is configured to let electromagnetic radiation having at least a predetermined minimum wavelength pass, wherein the irradiation by electromagnetic radiation to set the different degrees of hardness of the base layer is preferably carried out such that electromagnetic radiation is used having exclusively wavelengths whose magnitude is less than the one of the minimum wavelength. This may, for example, be carried out by use of a filter, whereby wavelength ranges below a predetermined wavelength are filtered out.

Alternatively or in addition, the masking is configured to absorb electromagnetic radiation, whose wavelength exceeds a threshold wavelength, wherein the threshold wavelength is preferably 300 nm, more preferably 380 nm, in particular 1000 nm.

Preferably, the irradiation with electromagnetic radiation to set the different degrees of hardness of the base layer is carried out with radiation, whose wavelength exceeds the threshold wavelength. Preferably, the radiation has a wavelength of more than 300 nm, more preferably of more than 380 nm, in particular more than 1000 nm. Alternatively, the radiation has its emission maximum at a wavelength of preferably more than 300 nm, more preferably of more than 380 nm, in particular of more than 1000 nm, but in each case still, in particular smaller, fractions of the emission spectrum below the respective wavelength.

Preferably, the masking is configured to let electromagnetic radiation having at least a predetermined maximum wavelength pass, wherein preferably the irradiation to set the different degrees of hardness of the base layer by electromagnetic radiation is carried out such that electromagnetic radiation is used having exclusively radiation with wavelengths whose magnitude is more than the one of the maximum wavelength. This may, for example, be carried out by use of a filter, whereby wavelength ranges above a predetermined wavelength are filtered out.

Preferably, the masking is applied such that it runs at least in portions synchronously to a decor image that is already on or in the base layer or that has been added subsequently to the base layer or a workpiece comprising the base layer. Thereby it is achieved that the areas with different degrees of hardness, which are produced by the method, run synchronously with the decor image. If, in addition, a structuring is subsequently inserted into the base layer, as described above, a significantly improved synchronism between the structuring and the decor image may advantageously be achieved by the sharp edges of the structuring.

Advantageously, a maximum difference between the structure and the corresponding image portion of the decor image of less than 5 mm, preferably less than 2 mm, more preferably of less than 1 mm, is thereby achieved.

Alternatively, a use of the invention for workpieces, for example plates or web material, which do not provide a specific decor but, for example, a monochrome surface, is also conceivable. As a concrete example, a monochrome red chipboard with a painted surface is described here, on which circles such as air bubbles are then visible as depressions using the method according to the invention. In the same way, the sharp-edged depressions according to the invention could be arranged like a kind of checkerboard pattern.

Furthermore, an intentionally "non-synchronous" structure to the decoratively printed surface is also conceivable.

The structuring developed by removal of material of the base layer has preferably a depth of 5 μm to 300 μm.

Further, according to the invention, a workpiece is provided comprising a base layer produced according to a method as describe above.

It is clear to the person skilled in the art that features and properties comprised by the above description of the method and related to the workpiece may also be understood as optional features and properties of the workpiece described here.

Preferably, the base layer comprises at least one depression having an internal angel β of more than 60 degrees, preferably more than 70 degrees, more preferably more than 80 degrees.

Alternatively or in addition, the average thickness of the base layer in the edge region of each depression, in particular in a range of 0 to 3 mm from the edge of each depression, deviates by less than 20%, preferably less than 10%, from the average thickness of the entire base layer.

Alternatively or in addition, the workpiece comprises a further layer, in particular a coating layer, and/or a, in particular plate-like or web-like, carrier element, wherein the layer and/or the carrier element are/is connected to the surface of the base layer, wherein the base layer comprises at least one depression, at the bottom of which the further layer and/or the carrier element are/is at least partially exposed.

Alternatively or in addition, the base layer comprises a depression, whose bottom let an underlying layer of the workpiece shine through or wherein the bottom of the depression is the underlying layer, whereby the degree of gloss of the underlying layer in the depression is recognizable, wherein said degree of gloss preferably differs from the degree of gloss of the base layer or the top layer of the panel by at least 2 gloss points, preferably at least 4 gloss points, more preferably by at least 8 gloss points.

Preferably, the masking remains at least in parts on the base layer after the method has been performed such that a workpiece is formed that comprises the base layer and at least portions of the masking. If, for example, unmasked areas in the base layer are provided comprising a lower degree of hardness by the irradiation for influencing the degree of hardness, these areas may be removed, wherein the masking on the areas with a higher degree of hardness remains. The depressions are then defined by the areas of the base layer having a higher degree of hardness and the masking disposed thereon. Therefore, the masking may also be configured such that it is in particular curable designed when remaining on the base layer and/or comprises properties changing the surface properties of the base layer such as, for example, a slip resistance or degree of gloss.

A further aspect of the invention relates to a workpiece comprising a base layer, wherein

- the base layer comprises at least one depression, at which the internal angle β is more than 60 degrees, preferably more than 70 degrees, more preferably more than 80 degrees, and/or wherein
- the average thickness of the base layer in the edge region of each depression, in particular in a range of 0 to 3 mm from the edge of each depression, differs by less than 20%, preferably less than 10%, from the average thickness of the entire base layer, and/or wherein
- the workpiece comprises a further layer, in particular a coating layer, and/or a, in particular plate-like or web-like, carrier element, wherein the layer and/or the carrier element are/is connected to the surface of the base layer, wherein the base layer comprises at least one depression, at the bottom of which the further layer and/or the carrier element are/is at least partially exposed, and/or wherein
- the base layer comprises a depression, whose bottom let an underlying layer of the workpiece shine through or wherein the bottom of the depression is the underlying layer, whereby the degree of gloss of the underlying layer in the depression is recognizable, wherein said degree of gloss preferably differs from the degree of gloss of the base layer or the top layer of the panel by at least 10 gloss points, preferably at least 5 gloss points.

Preferably, the base layer of the workpiece has been produced according to the method described above.

Depressions in the base layer preferably form a structure, which is at least in part arranged synchronously to a decor image printed before or subsequently on the base layer or the workpiece.

According to the invention, a device for performing the method is provided.

It is clear to the person skilled in the art that features and properties comprised by the above description of the method and/or workpiece and related to the device may also be understood as optional features and properties of the device described here.

Preferably, the device comprises a control device, in particular with electronic control means, which is by means of respective coding configured to perform the method as described above by the device.

In particular, the device comprises a transport device to transport the base layer and/or the carrier element to different processing stations of the device and/or to move different processing stations of the device to the base layer and/or the carrier element.

Preferably, the device comprises a processing station configured to apply the masking. For this purpose, said processing station preferably comprises digital printing technology.

Preferably, the device comprises at least a processing station configured to irradiate the base layer and/or the masking. For this purpose, said processing station comprises preferably UV and/or IR radiation sources.

Preferably, the device comprises at least a processing station configured to remove the masking and/or the base layer at locations, at which the masking has been applied. Said processing station is particularly configured to remove the base layer and/or masking physically and/or chemically (for example as described above).

In the following, the invention is explained in more detail with reference to the accompanying figures. In detail:

Figure 4A:
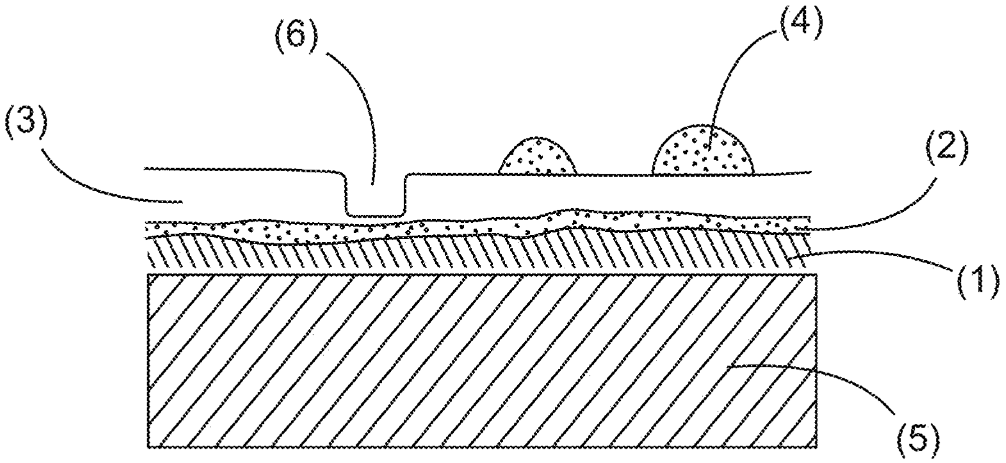
Figure 4B:
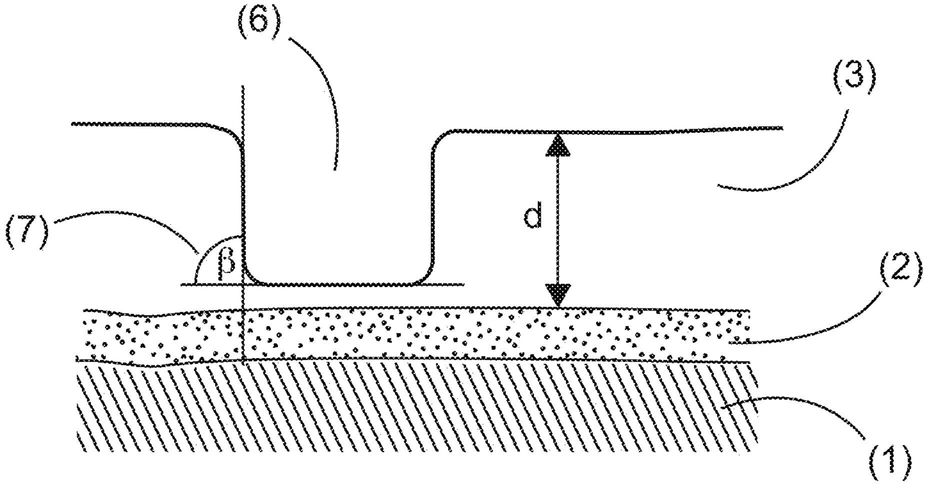
Figure 4C:
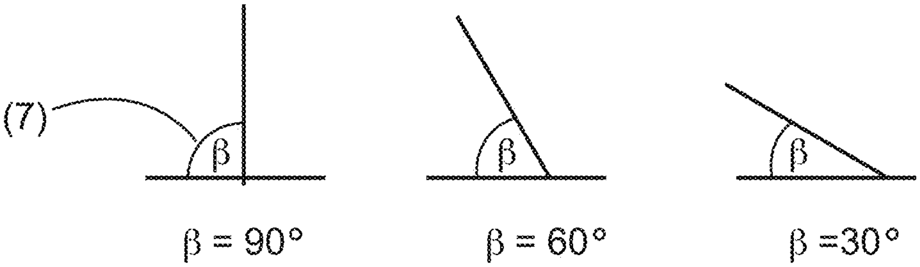
Figure 5A:
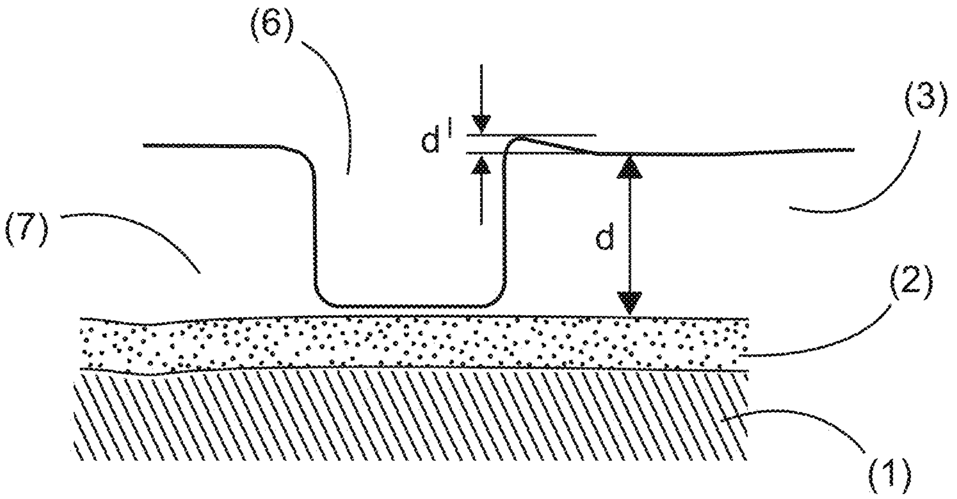
Figure 5B:
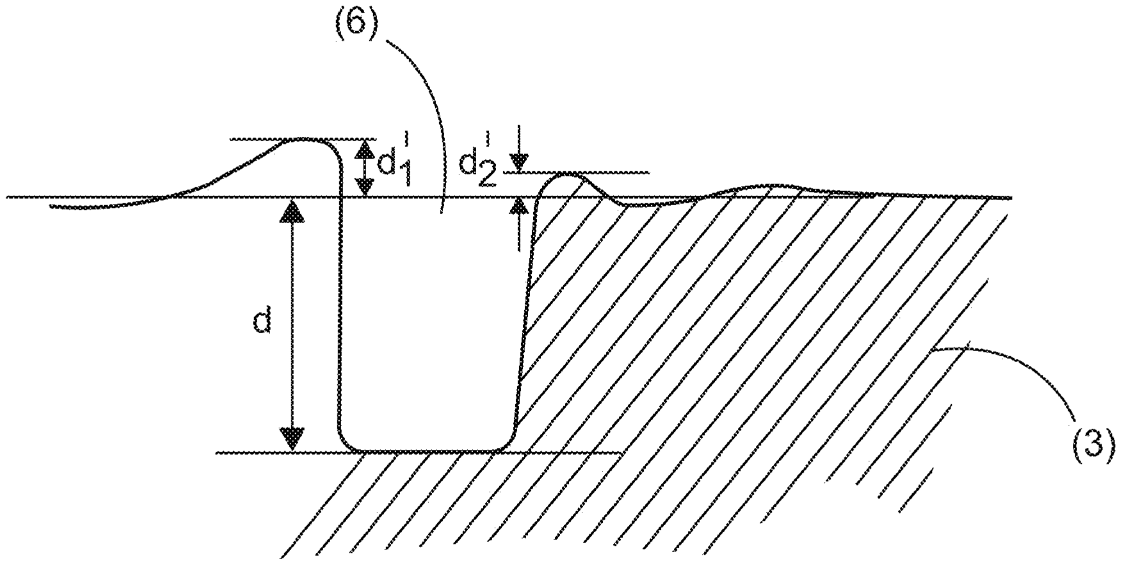
Figure 6A:
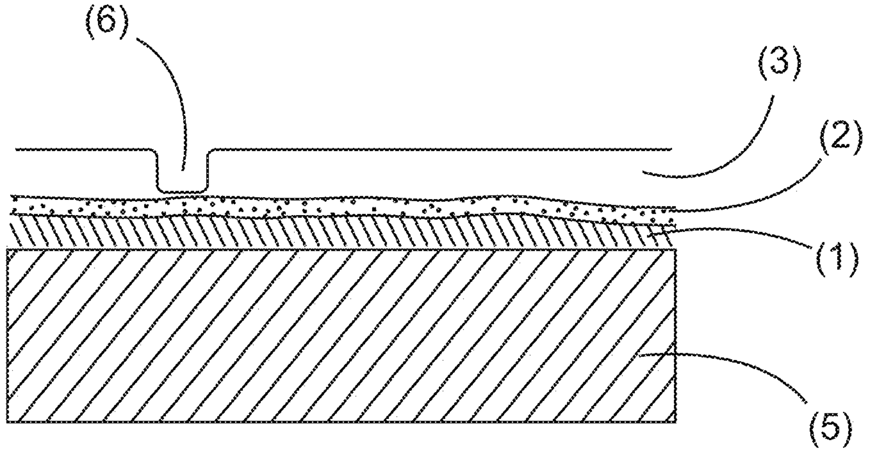
Figure 6B:
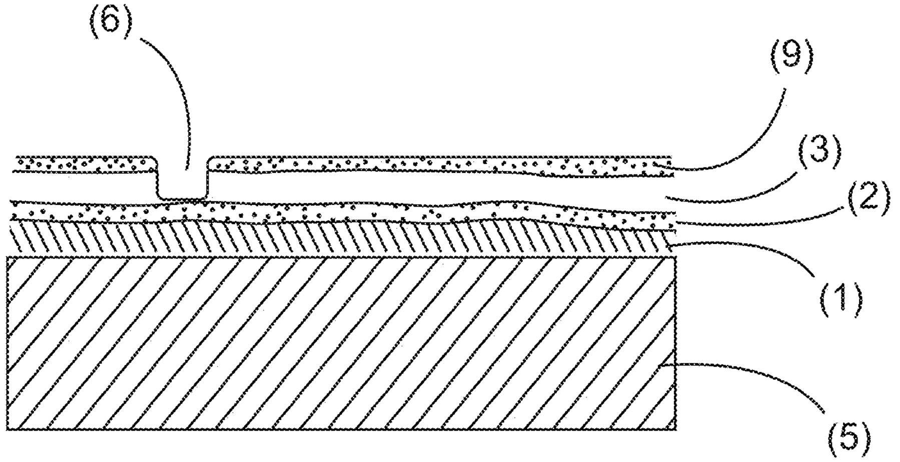
Figure 6C:
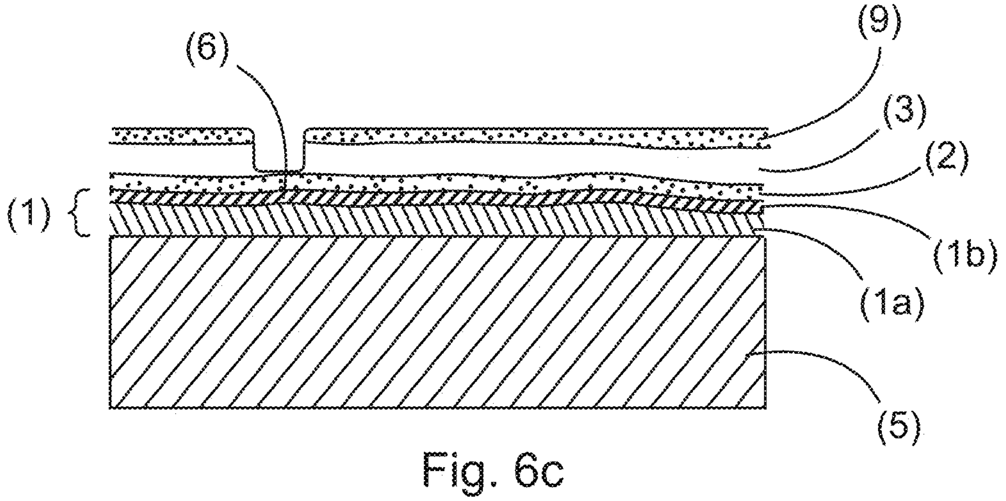
Figure 7:
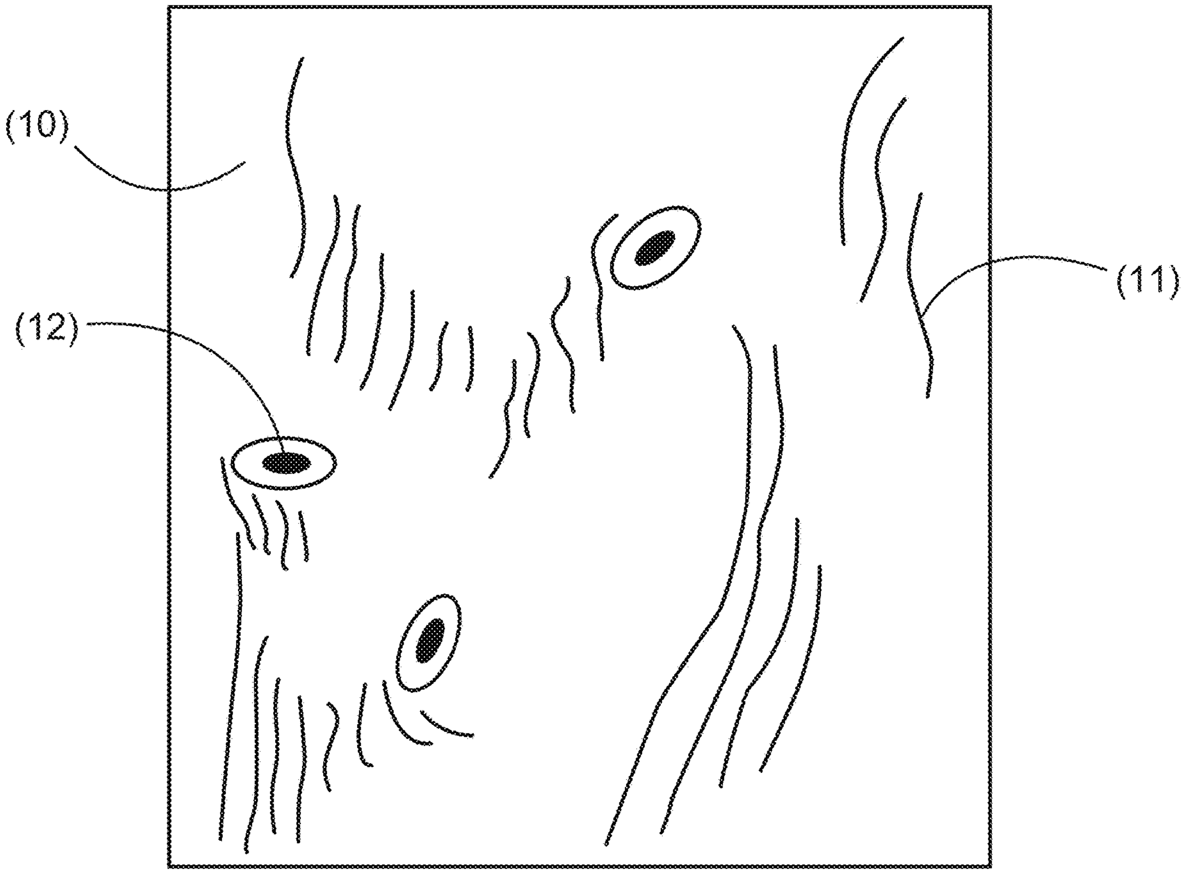
Figure 8A:
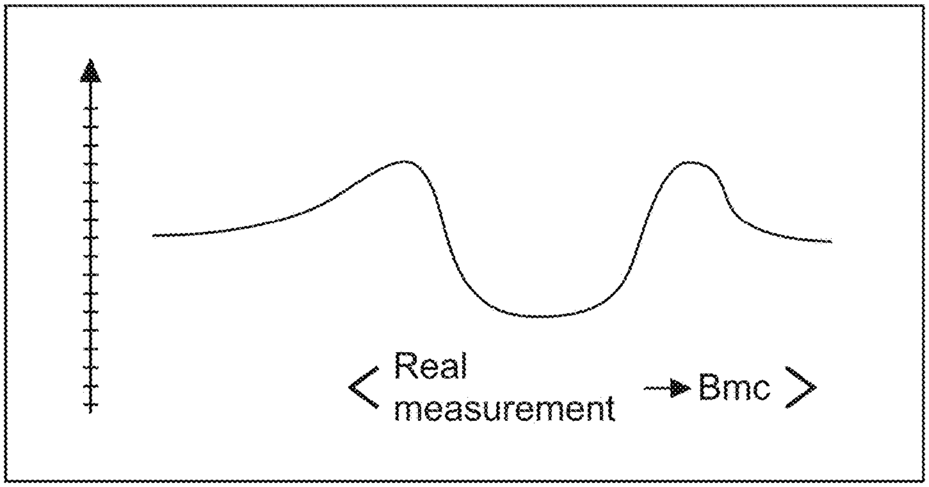
Figure 8B:
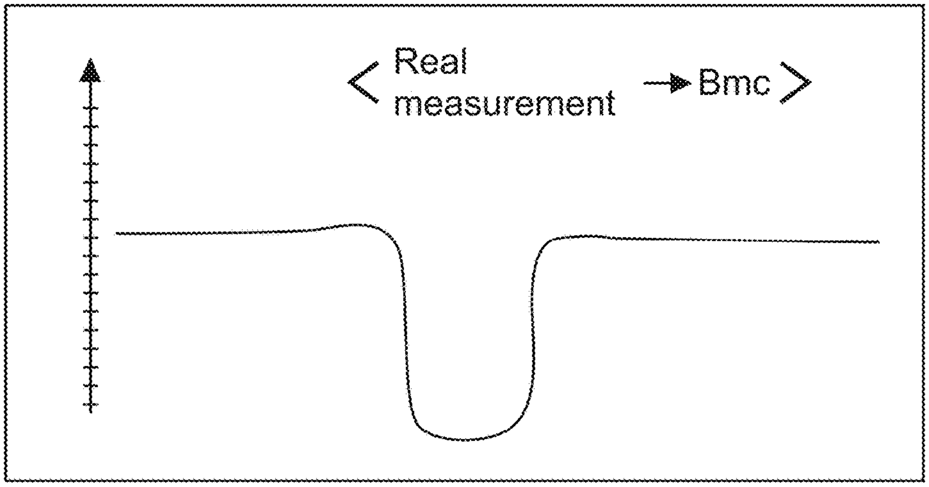
Figure 8C:
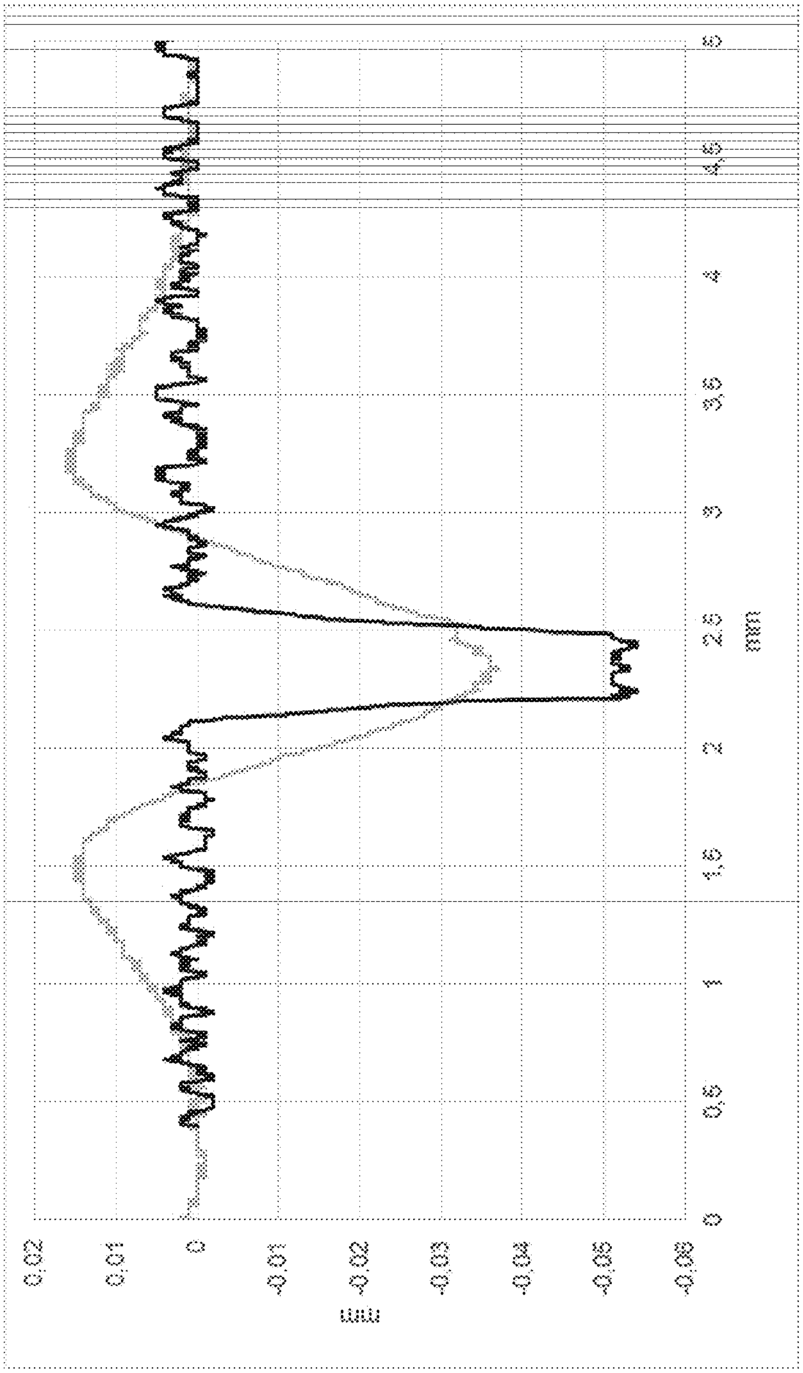

FIGS. 4*a* to *c* show a representation of the internal angle,

FIGS. 5*a* to *b* show a representation of the bulging of the structure,

FIGS. 6*a* to *c* show inventive workpieces,

FIG. 7 shows an exemplary surface of the workpiece,

FIGS. 8*a* to *c* show comparative measurements of depressions, and

Figure 9A:
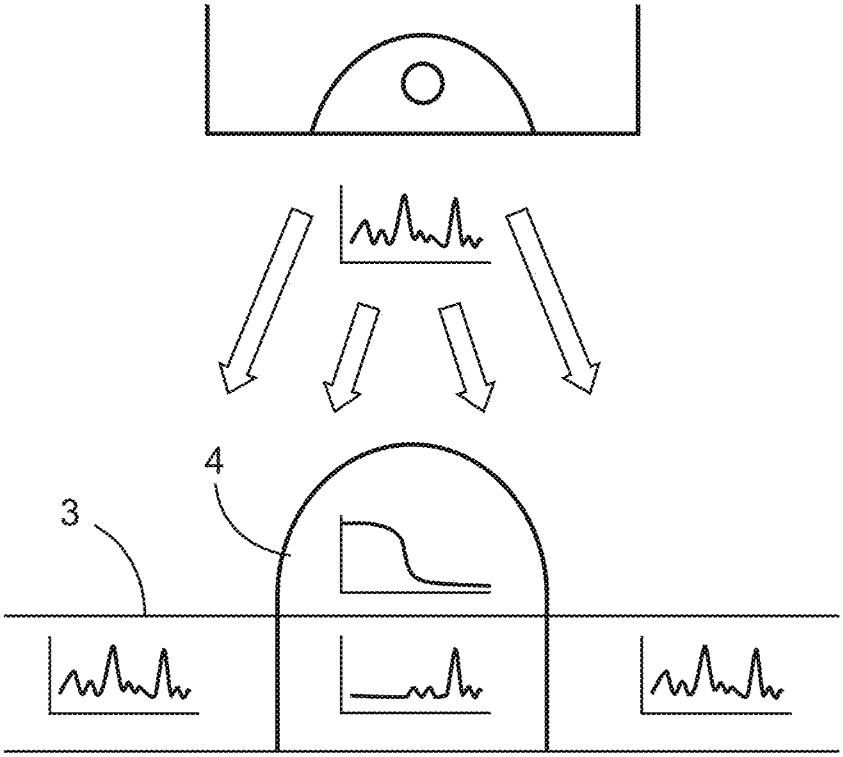

FIGS. 9*a* and *b* show a possibility to exclude areas in the base layer from the exposure to electromagnetic radiation.

Figure 1:
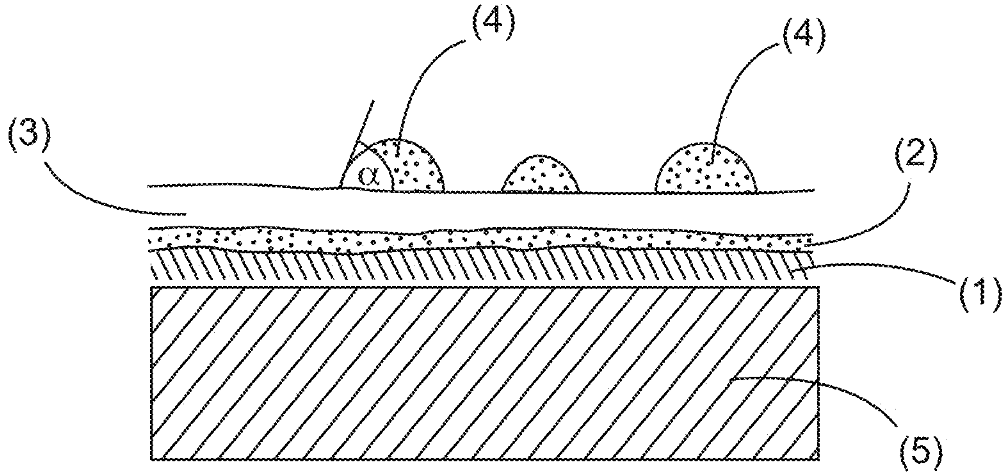
FIG. 1 shows a workpiece with applied masking.

FIG. 1 shows a workpiece with applied masking.

This Figure shows the workpiece comprising a plurality of layers. A workpiece core is provided undermost, on which a first base coat 1 and a second base coat 2 are provided. A base layer 3 is applied thereover, on the surface of which a masking in form of droplets 4 is provided. However, there are also applications that do not require a first base coat 1 and/or a second base coat 2.

These liquid droplets 4 are illustrated with different droplet volumes. Furthermore, the edge angle α is shown as the angle between the surface of the base layer 3 and a tangent to the outer edge of the droplet 4 at the position, at which the edge of the droplet 4 abuts the surface of the base layer 3.

For example, the edge angle α in the cross-section or side view of the base layer 3 and masking is understood to be that acute angle between the surface of the base layer 3 and a tangent to the outer edge of the masking at the point where the edge of the masking, in this case the edge of the droplets 4, abuts the surface of the base layer. If the base layer 3 is not flat, a tangent to the base layer 3 is also applied at this position, with the edge angle α then being formed as an acute angle between the two tangents.

However, the following definition from above may also be used here, according to which the edge angle α is the acute angle between a tangent to the outer edge of the masking at the position where the edge of the masking, in this case the edge of the droplets 4, abuts the surface of the base layer 3, and a plane perpendicular to the emission direction of the radiation. In this way, an edge angle α is defined, which, the larger it is, is a measure of how good the separation between masked and unmasked areas is. There is then a separation as sharp as possible of the radiation input to the base layer 3 between masked and unmasked areas.

Thus, a flat droplet has a small edge angle α, while a very high standing droplet has a larger edge angle α.

Figure 2:
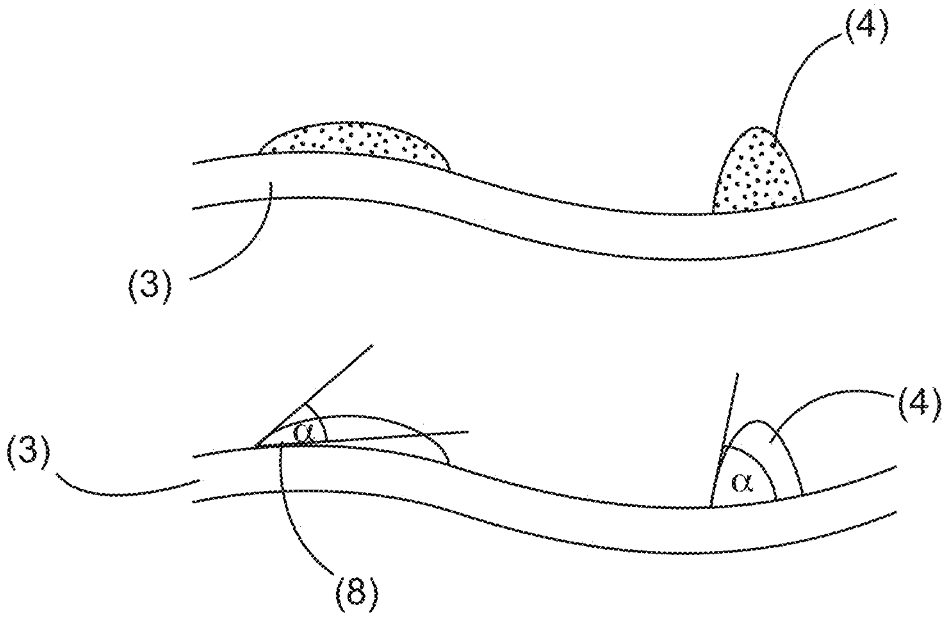
FIG. 2 shows the influence of the edge angle.

For clarification, this is shown in FIG. 2.

This Figure shows a surface of α, in particular liquid, base layer 3 having a masking in form of droplets 4, which show different edge angles α, applied thereon. In the upper illustration, the droplets 4 are shown dotted, without a representation of the edge angle, in the lower illustration, the same droplets are then not dotted, but are each shown with an edge angle α drawn in. For a better understanding, in each case a flat droplet (left) is shown with a correspondingly small edge angle α, and a higher uprising droplet 4 is shown with a larger edge angle α (right), so that α (left)<α (right) applies.

It is clearly evident that a masking, whose edge angle $\alpha_1$ is very small, provides a slowly increasing thickness from the edge of the masking towards its center. This in turn results in that a masking effect with respect to electromagnetic radiation for the underlying base layer at the edge of the masking is low, since there is little masking material above the base layer 3. In the center of the masking, on the other hand, the greatest thickness of the masking is present, so that the greatest masking effect also occurs here. Thus, the radiation input of electromagnetic radiation into the base layer 3 continues to decrease from the edge of the masking to the center of the masking, which results in an uneven Influence of the degree of hardness of the base layer 3 below the masking.

In this way, with a steep edge angle $\alpha_2$, it may be achieved that also at the edge of the masking already a large quantity of masking material is present, which ultimately leads to a homogenous masking effect, whereby the influence of the degree of hardness of the base layer 3 is carried out homogenously.

Figure 3:
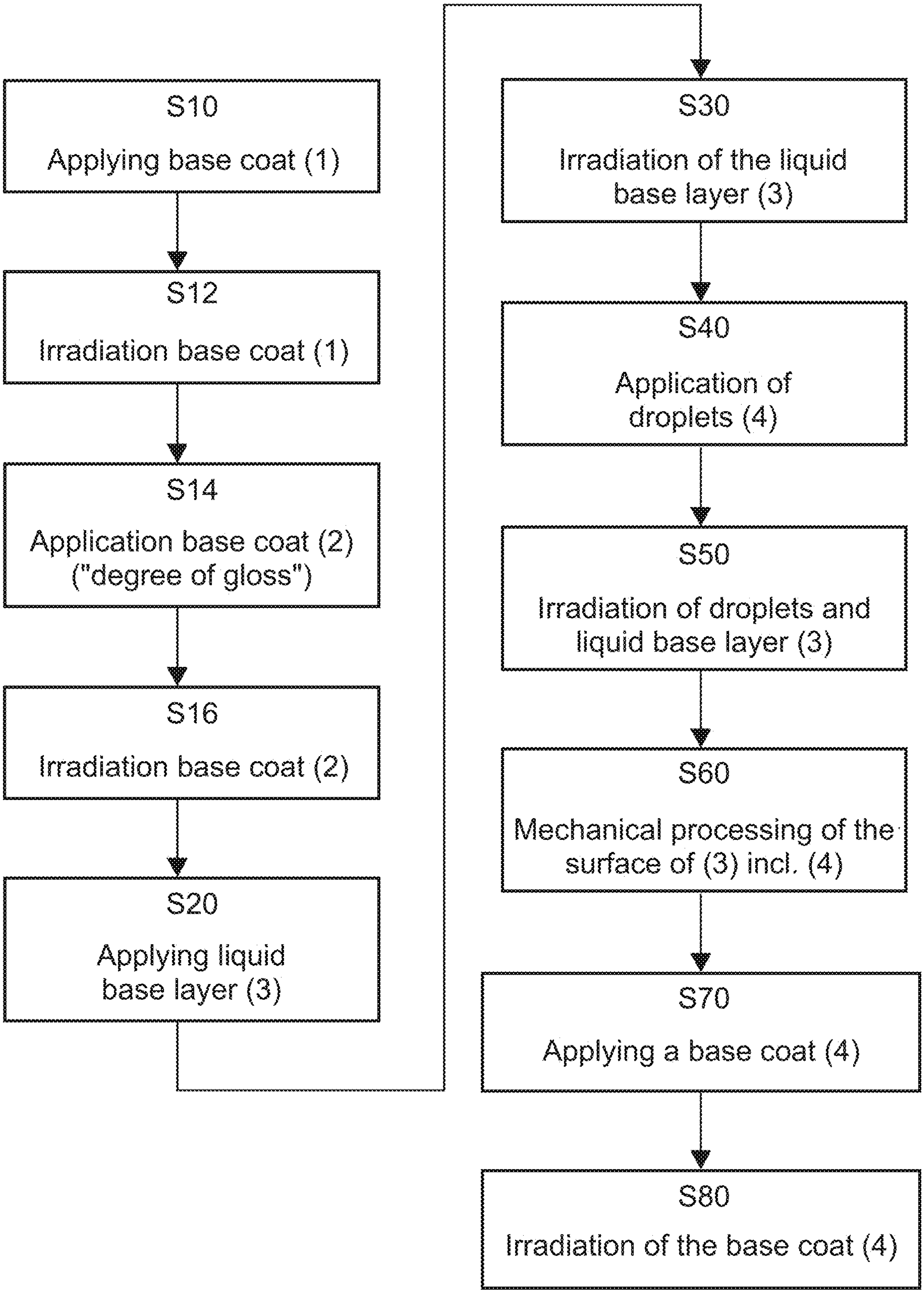
FIG. 3 shows a possible sequence of steps of the inventive method.

FIG. 3 shows a possible sequence of steps of an inventive method.

The sequence of process steps in the method according to the invention is shown in the drawing. For clarification of the process steps, reference is also made to FIG. 1. According to the method, a workpiece core 5 is coated with a base coat 1 (step S10), the workpiece with the base coat 1 is subsequently irradiated with electromagnetic radiation (step S12). The first base coat 1 may, for example, function as primer. A second base coat 2 is subsequently applied (step S14) and also irradiated with electromagnetic radiation (step S16). The base coat 2 serves to achieve a desired degree of gloss of the workpiece produced by this method. The base layer 3 is then applied thereon (step S20) and also irradiated with electromagnetic radiation (step S30). Afterwards, liquid droplets 4 for forming a masking are applied on the base layer 3 (step S40). Subsequently, the liquid base layer 3 and the applied droplets 4 are irradiated with electromagnetic radiation (step S50) to set a desired degree of hardness in the base layer 3. Thereby, the areas of the base layer 3 being covered by the masking change their degree of hardness less than the areas that provide no masking. The base layer 3 irradiated in this way is processed by mechanical means (step S60). This is carried out, for example, by brushing or, alternatively, also by contactless processing such as sandblasting, water-, air- or alternative fluids for jetting. A further step 70, in which a further base coat is applied, and a final step S80, in which the entire layer structure on the workpiece core 5 is irradiated with electromagnetic radiation, is carried out after step S60.

It should be noted that the steps S10, S12, S14, S16, S20, S30, S60, S70 and S80 are to be considered as optional method steps, which are listed here exemplarily. However, an embodiment of the method is conceivable that merely comprises the steps S40 and S50. Furthermore, further embodiments of the method are conceivable that comprise at least a further one of the steps S10, S12, S14, S16, S20, S30, S60, S70 and S80 in addition to steps S40 and S50.

FIGS. 4*a* to *c* show a representation of the internal angle of a depression in the base layer.

An internal angle 7 of the structure on the surface of the workpiece achieved by the inventive method is shown in FIGS. 4*b* and *c*. The structure is thereby formed by depressions 6, which are shown in FIG. 4*a* and represented in in enlarged form in FIG. 4*b*. The further elements described by reference signs correspond to the ones of the previous Figures. Material of the base layer 3 with a thickness d has been removed at positions of the depressions 6 approximately up to the underlying layer 2. The internal angle 7 is shown in FIG. 4*b* as the acute angle β between the horizontal tangent in the deepest point of the bottom of the depression 6 and a tangent to the wall of the depression 6. For a precise definition of the internal angle 7, it is referred to the introduction of the description. FIG. 4*c* again shows the internal angle 7 with the value β in three possible characteristic forms with β=90 degrees, β=60 degrees or β=30 degrees. The larger the value β, the more sharp-edged the corresponding depression 6 appears to the observer.

FIGS. 5*a* and *b* shows a representation of the bulging of a structure in the region of the depression.

In this Figure, a depression 6 is shown in enlarged form, which has a depth d that extends from the surface of the base layer 3 to the underlying layer (second base coat 2). In particular, FIG. 5*b* shows the right and left edges of the depression 6, also called pore, where a bulge with height $d_1'$ (on the left side) and a bulge with height $d_2'$ (on the right side) are shown. These bulges are elevations of the base layer 3 with the average layer thickness d of the base layer 3, which are located at the edge of the depression 6. According to an embodiment of a panel according to the invention, the maximum height and/or the average height d' of the bulge (i.e. $d_1'$ and $d_2'$ and/or $0.5\times[d_1'+d_2']$) is less than 20% of d, preferably less than 10% of d.

FIG. 6 shows a workpiece according to the invention.

A workpiece according to the invention having a workpiece core 5, a first base coat 1 and a second base coat 2 and an overlying base layer 3 is shown in FIG. 6*a*. The base layer 3 comprises one (or a plurality of) depressions 6. The depression 6 has been formed by removing areas of the base layer 3, which have been providing a lower degree of hardness as other areas of the base layer 3.

In FIG. 6*b*, there is additionally a base coat layer 9 arranged above the base layer 3, which may, for example, influence the degree of gloss of the surface. Furthermore, this base coat layer 9 may also be used to adjust chemical and physical properties of the surface, such as scratch hardness or micro-scratch resistance.

FIG. 6*s* represents in addition a further variant, in which the first layer of the first base coat 1 comprises a priming layer 1*a* as well as a decor layer 1*b* printed digitally and/or analogously thereon or exclusively consists of the priming layer 1*a* and/or the decor layer 1*b*. This decor layer 1*b* may be according to a digital template, such as an image file, for example a wood reproduction, a stone decor or a fantasy decor, as well as a photorealistic other object or image.

The structure formed by the depressions 6 may also be created according to a digital template in such a way that it is synchronous with the underlying decor layer 1*b*. The basis for the synchronous creation may be the digital template, on which the decor layer 1*b* is also based, as described above. It may also be a template derived from this digital template.

FIG. 7 shows an exemplary surface of the workpiece.

An exemplary surface of a workpiece according to the invention is shown in plan view. Here, a wood reproduction is chosen as an example, which is located on the surface 10 of the workpiece. On the surface 10 of the workpiece, representations of wood pores 11 and knotholes 12 are provided. Both the wood pores 11 and the knotholes 12 are printed as a decor image on the panel by the digitally printed layer 1*b*, cf. FIG. 6*c*. In addition, portions of the wood pores 11 and the knotholes 12 are also haptically and visually represented by the depressions 6 according to the invention, in each case at the exact locations where they are printed on, cf. in this regard FIGS. 4, 5 and 6. The representations of the wood pores 11 and knotholes 12 of the decor image are thereby provided synchronously with the depressions 6, so that the impression of the workpiece as a real wood panel is as realistic as possible.

FIGS. 8*a* to *c* show comparative measurements of depressions.

FIG. 8*a* shows the principle result of a laboratory measurement of a base layer with a depression generated according to the prior art. The depth of the depression is shown upwards and the width of the depression rightwards. The bulge at the edge of the depression is clearly visible here, as are the small internal angles of the depression.

FIG. 8*b* shows the principal result of a laboratory measurement of a base layer with a depression produced by the method according to the invention. Here, no edge bulging is visible, or only a slight edge bulging of a height quoted from the surface of the base layer of less than 10% of the layer thickness. In addition, one can see the large internal angle 7 of the depression, which is characterized by a steep drop in the walls of the depression.

FIG. 8*c* shows two measurements corresponding to FIGS. 8*a* and 8*b*. Shown in gray is a result showing a measured base layer with the depression created according to the prior art. The relatively shallow rising sides of the depression, which result in a relatively small internal angle, are clearly visible here. Further, the edge bulges around the opening of the depression are recognizable so that depression does not slope relatively sharply. In contrast, a depression is shown in black that was created according to the teaching of the invention. Here, the edge bulges are minimal or, in some cases, absent, and the sides of the depression are relatively steep compared to those of the depression shown in gray, causing a large internal angle. The structure or depression in FIG. 8*c* produced by the process according to the invention is thus much more sharp-edged than it would be achievable with prior art methods.

FIGS. 9*a* and *b* show a way to exclude areas in the base layer from exposure to electromagnetic radiation.

FIG. 9*a* shows a base layer 3 extending from left to right. A masking in form of droplets 4 is applied on the surface of the base layer 3. A radiation source for electromagnetic radiation, which emits radiation on the base layer 3 as well as the masking, is provided above the base layer 3 and the masking.

The material of the masking is configured to let electromagnetic radiation with a wavelength of more than 380 nm pass and to absorb electromagnetic radiation with a wavelength of less than 380 nm. In general, the material of the masking is configured to let electromagnetic radiation with a wavelength being equal to or more than a specific threshold wavelength pass and to absorb electromagnetic radiation with a wavelength being less than the specific threshold wavelength. However, the material of the masking may also be configured to absorb electromagnetic radiation of a very broad wavelength spectrum, for example from 180 nm to 1500 nm.

The base layer 3 experiences therefore in the area underneath the masking a radiation input of radiation with a wavelength of more than 380 nm, while the areas to the left and the right therefrom receive a radiation input with the complete spectrum of the radiation source.

Figure 9B:
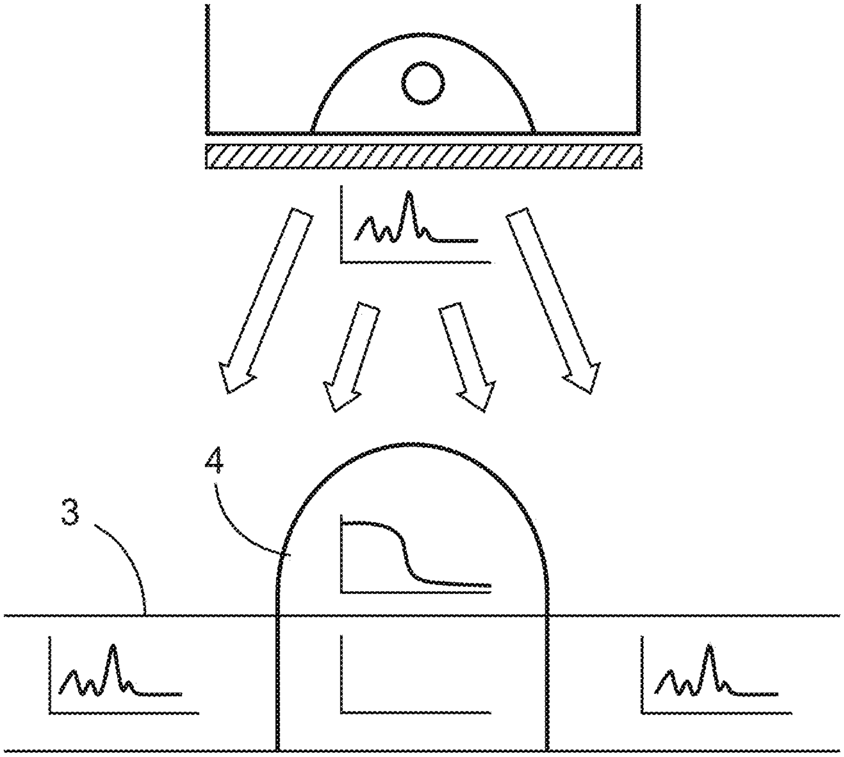

In this way, the degree of hardness of the base layer 3 underneath the masking is less influenced by the radiation than the exposed areas to the left and the right therefrom. To further reduce the effect of the radiation on the base layer, a filter may be used, as shown in FIG. 9*b*, which is placed in front of the radiation source.

The filter is configured to let only electromagnetic radiation with a wavelength of less than 380 nm pass. This ensures that no radiation is incident on the masking, which could be transmitted by it. Thus, the area below the masking does not experience any radiation input. In general, the filter is tuned to the threshold wavelength of the masking.

The areas of the base layer 3 to the left and to the right therefrom, each receive a radiation input of the filtered spectrum with wavelengths of less than 380 nm.

In this way, an influence on the degree of hardness of the base layer may be carried out very precisely area by area, wherein the masked areas are entirely shielded from the influence of the electromagnetic radiation.

It is clear to the person skilled in the art that this example does not have a limiting effect on the invention. In particular, the wavelength of 380 nm referred to herein and thus the properties of the masking and the filter may be chosen differently in other embodiments without changing the principle described herein.

In the following, the invention is described with reference to preferred aspects relating to the production of depressions.

In an embodiment according to the invention, a workpiece is manufactured, in which the internal angle between the printed surface and the visible and tactile structure is very large. Due to this generated "sharpness" of the structure, the impression of a much greater depth results, despite the same measurable depth of, for example, 70 μm, as with flat structures. Any structures with an internal angle of more than 60 degrees, in particular more than 80 degrees, have been shown to be particularly suitable (cf. FIG. 4*a* to *c*).

A further aspect is the removal of the base layer up to the bottom or until the underlying layer of the workpiece shows up.

FIG. 6, for example, represents an inventive workpiece or panel. It may be described as follows: Panel comprised of a core 5 and a layer structure 1, 2, 3, comprising a digitally printed decor layer and one or more monochrome or transparent coating layers, applied on at least one side of the core, wherein at least a transparent coating layer (base layer 3) has been removed in parts such that at the removed locations, which are referred to as pores 6 in the following, the underlying coating layer 2, also referred to as base coat, represents the uppermost layer of the layer structure.

In the following, the more specific term "droplet" is used for "masking". According to an aspect of the invention, the following method is provided. With step S40, applying droplets 4 on the liquid base layer 3 is carried out, wherein said liquid base layer is pretreated by means of electromagnetic radiation (step S30) such that the droplets 4 do not or only very little, i.e. less by than 10% of the layer thickness of the base layer 3, preferably less than 1% of the layer thickness of the base layer, sink in therein and form an edge angle of more than 20 degrees, preferably more than 50 degrees, more preferably more than 70 degrees, with the base layer 3 at positions, at which they hit the surface of the base layer 3. In the tests carried out, it has proved to be particularly useful to perform the pretreatment (step S30) of the liquid base layer 3 under inert conditions (by introduction of nitrogen) and with a UV LED (manufacturer ITL—Integration Technology, Ltd.; power 2-4 W/cm2; feed 25 m/min; alternatively, Phoseon Fireedge FE 300 or 400; 2-4 W/cm2; also 25 m/min). By the use of a liquid for the droplets 4 according to the compositions given by way of example, an edge angle greater than 70 degrees has been established after the droplets 4 have been applied. The droplets comprise at least a component, which absorbs UV radiation in a wavelength spectrum to be selected, for example BASF Tinuvin 477 blocks wavelengths below 380 nm, such that, after the subsequent further irradiation of the liquid base layer together with the applied droplets 4 with UV radiation, the curing of the liquid base layer at positions, at which the droplets have been applied, is at least by a factor of 2 lower than at the other positions.

The tests have shown that thereby in a further step the base layer 3 at locations, at which the droplets 4 have been previously applied, may be again removed entirely up to the underlying layer of the base coat 2. The removal of the at least by a factor of 2 less cured areas of the base layer 3 may be carried out with mechanical auxiliary means or with fluid jets such as, for example, water, mixtures with solids or the like. In the performed tests, circular rotating brushes with metal bristles with a brush diameter of 350 mm and bristle diameter of 200 μm have been applied with good results. The measurements at the respectively produced panels have shown that the inventive pretreatment of the liquid layer with electromagnetic radiation (here: UV radiation in the above mentioned wavelength range under inert conditions in step S30), alone and/or in combination with the use of a composition of the liquid droplets 4 such that they have a higher surface tension than the base layer 3, have led to the fact that a large edge angle between the droplets 4 and the base layer 3 is established, and therefore a very sharp separation of areas with high curing of the base layer and the areas covered by the droplets 4 in the subsequent following further irradiation (step S50) takes place. The base layer 3 could therefore be removed completely up to the underlying layer of the base coat 2 in the following step S60 by mechanical processing of the surface at locations, at which the droplets 4 have been applied.

Furthermore, this procedure leads to the fact that the measured internal angles of the pores (cf. FIG. 4) were more than 75 degrees and the maximum measures edge bulging at the edge of the pores mas not more than 10% of the layer thickness of the base layer 3 (cf. FIG. 5 and FIG. 8).

The workpiece may be, for example, primed white before the application of the liquid base layer 3 and subsequently printed with a digital decor image. This layer of digital print ink 1*b*, specifically for creating the decor image, may than be covered with the base coat 2, which also serves for setting the degree of gloss of the pores 6 generated later, since the base layer 3 applied above the base coat 2 is subsequently completely removed again at locations of the pores 6 according to the method and thus the base coat 2 becomes again visible at said locations.

In particular, these three properties of the panel according to the invention, namely the low bulging of the edges, the large internal angles of the pores and the great depth of the pores to the underlying layer, clearly stand out from the prior art. They are all parts of the solution to the problem, namely that the pores produced by the method according to the invention should be very well perceived both visually and haptically, and should leave an impression of great depth on the observer.

Before describing specific embodiments, specific aspects of the invention are again highlighted below.

According to a first aspect, a method, in particular for manufacturing areas providing different degrees of hardness in a base layer 3, is provided comprising the following steps:

step (S40): applying a masking on at least a partial area of the surface of the base layer 3, wherein the masking is configured to at least partially absorb electromagnetic radiation;

step (S50): irradiating the base layer 3 and the applied masking with electromagnetic radiation, in particular with UV radiation and/or IR radiation, to set different degrees of hardness of the base layer 3.

According to a second aspect, a method according to the first aspect is provided, wherein the hardness degree gradient in x-direction between the highest degree of hardness 1 and the lowest degree of hardness 0 is set within a length of less than 0.1 mm, preferably less than 10 μm, more preferably less than 1 μm.

According to a third aspect, a method according to the first or second aspect is provided, wherein, when performing step S40, at least a portion of the base layer 3 or the entire base layer 3 is liquid or at least not already completely cured.

According to a fourth aspect, a method according to any one of the above three aspects is provided, wherein the base layer 3 and the masking are complementary to each other such that an edge angle α between the base layer 3 and the masking is achieved, which is preferably more than 20 degrees, more preferably more than 50 degrees, in particular more than 70 degrees; and/or wherein, in particular while performing step S50, the height of the masking at the edge of the masking is at least 50%, preferably at least 70%, more preferably at least 90%, of the height of the masking in the center of the masking.

According to a fifth aspect, a method according to any one of the above four aspects is provided, wherein a further step S20 is performed, in which the base layer 3 is applied on a, in particular plate-like or web-like, carrier element and/or on a further layer, in particular on a coating layer, and/or wherein a, in particular plate-like or web-like, carrier element and/or on a further layer, in particular on a coating layer, is applied on the base layer 3.

According to a sixth aspect, a method according to any one of the above five aspects is provided, wherein the masking on the surface of the base layer 3, in particular when performing step S50, is present in liquid form or has been at least partially, preferably completely, solidified, and/or wherein the material forming the masking is applied in liquid form and/or in gaseous form on the surface of the liquid base layer 3, wherein preferably, when applying the material in gaseous form, a condensation of the material to the masking on the surface of the base layer 3 takes place, and/or wherein the material forming the masking is applied on the base layer 3 in the form of at least one droplet 4, preferably with a volume of less than 1 nL, more preferably of less than 200 pL, in particular of less than 40 pL.

According to a seventh aspect, a method according to any one of the above six aspects is provided, wherein before and/or during step S40 a step S30 is performed, in which the base layer 3 is irradiated with electromagnetic radiation, in particular UV radiation and/or IR radiation, whereby the degree of hardness and/or the viscosity and/or the surface tension of the base layer 3 is set to a desired value, wherein preferably by irradiation of the liquid base layer 3 with electromagnetic radiation in step S30 a viscosity gradient or hardness gradient in the base layer 3, such that the side of the base layer 3 facing away from the radiation source of the electromagnetic radiation provides a viscosity or hardness less, preferably by a factor of at least 4, than the side of the base layer 3 facing towards the radiation source, or a changed surface tension is developed.

According to a eighth aspect, a method according to any one of the above seven aspects is provided, wherein the layer thickness of the liquid base layer 3 at positions, at which the masking, in particular in the form of droplets 4, is applied, is reduced, wherein the reduction is preferably less than 10 μm, more preferably less than 1 μm, wherein the reduction of the layer thickness is in particular carried out by sinking of the masking into the base layer 3 and/or by displacement of the base layer 3 by the masking.

According to a ninth aspect, a method according to any one of the above eight aspects is provided, wherein the surface tension of the material forming the masking is equal to or more than the surface tension of the base layer 3.

According to a tenth aspect, a method according to any one of the above nine aspects is provided, wherein a difference in the curing and/or polymerization of the base layer 3 between areas, on which the masking has been applied, and areas, on which the masking has not been applied, is present after step S50, wherein the difference in the curing preferably corresponds to at least a factor of 2, more preferably to at least a factor of 3.

According to a eleventh aspect, a method according to any one of the above ten aspects is provided, wherein after step S50 a step S60 is performed, in which the masking is removed or in which the masking and the base layer 3 are removed at positions, at which the masking was applied, wherein preferably at least 80% of the layer thickness of the base layer 3 is removed and the base layer 3 is more preferably completely removed to form depressions and/or through holes in the base layer 3 at said positions, wherein the removal of the masking oder the removal of the masking and the base layer 3 is preferably done physically and/or chemically, and/or wherein after step S50 a step S70 is performed, in which a further layer comprising a base coat is applied, and/or wherein after step S50 a step S80 is performed, in which the entire layer structure is irradiated with electromagnetic radiation, in particular UV radiation.

According to a twelfth aspect, a method according to any one of the above eleven aspects is provided, wherein the masking is configured to absorb electromagnetic radiation, with which the base layer 3 and the applied masking in step S50 are irradiated, by at least 60%, preferably by at least 80%, more preferably entirely, and/or wherein the masking is configured to absorb electromagnetic radiation, which wavelength falls below a threshold wavelength, and/or wherein the irradiation in step S50 is carried out with electromagnetic radiation, which wavelength falls below the threshold wavelength, and/or wherein the masking is configured to at least let electromagnetic radiation providing a predetermined minimum wavelength pass, wherein the irradiation in step S50 with electromagnetic radiation is preferably carried out such that electromagnetic radiation is used which only provides radiation with wavelengths, which are below the minimum wavelength.

According to a thirteenth aspect, a method according to any one of the above twelve aspects is provided, wherein the masking is applied such that it runs at least in partial areas synchronously to a decor image, which is already on or in the base layer 3 or which has been added subsequently to the base layer 3 or a workpiece comprising the base layer 3.

According to a fourteenth aspect, a method according to any one of the above thirteen aspects is provided, wherein the masking at least partially remains on the base layer 3.

According to a fifteenth aspect, a workpiece comprising a base layer 3, which has been in particular manufactured according to a method according to any one of the above fourteen aspects, is provided, wherein the base layer 3 comprises at least one depression, at which the internal angle β is more than 60 degrees, preferably more than 70 degrees, more preferably more than 80 degrees, and/or wherein the average thickness of the base layer 3 in the edge region of each depression, in particular in a range of 0 to 3 mm from the edge of each depression, differs by less than 20%, preferably less than 10%, from the average thickness of the entire base layer 3, and/or wherein the workpiece comprises a further layer, in particular a coating layer, and/or a, in particular plate-like or web-like, carrier element, wherein the layer and/or the carrier element is/are connected to the surface of the base layer 3, wherein the base layer 3 comprises at least one depression, at the bottom of which the further layer and/or the carrier element is/are at least partially exposed, and/or wherein the base layer 3 comprises a depression, whose bottom let an underlying layer of the workpiece shine through or wherein the bottom of the depression is the underlying layer, whereby the degree of gloss of the underlying layer in the depression is recognizable, wherein said degree of gloss preferably differs from the degree of gloss of the base layer 3 or the top layer of the panel by at least 10 gloss points, preferably at least 5 gloss points.

The invention is described below with reference to specific exemplary embodiments.

Exemplary Embodiment 1

A mineral-filled PVC plate 5 with a thickness of 6 mm is fed to a first painting station. There, a base coat 1 in the form of a radiation-curing acrylate paint, which is colored white with $TiO_2$, is applied with a layer thickness of 80 g/$m^2$ using a roller application process. Said base coat 1 is subsequently cured by a Hg-UV lamp with a broad wavelength range of 300-440 nm, wherein the plate 5 in transported underneath the Hg lamp with a constant speed of 20 m/min. A previously digitally scanned piece of marble is then printed as a decor image onto said white primer in a continuous process using a single-pass digital printer and a digital printing ink 1*b*. An average of 4 g/m2 of digital printing ink is applied, which corresponds to a layer thickness of approx. 4 μm.

Subsequently, said digital printing ink is coated with a base coat 2, which is provided as radiation-curing acrylate mixture (matte coating) with a degree of gloss of 3 gloss points, wherein said acrylate mixture has been set to 5 gloss points (measured with device: Byk Micro-TRI-Gloss, angle 60 degrees) with respect to the degree of gloss. The panel coated in this way is fed to a further curing station and irradiated over the product width of 1250 mm in throughfeed at 20 m/min with a Hg-UV lamp having a power of 60 W/cm (corresponding to approx. 50% of the maximum lamp power). The surface is then coated with a further acrylate mixture, the liquid base layer 3, with a layer thickness of 80 μm by a roller application process. Said liquid base layer is flooded with nitrogen in a drying device to displace the oxygen contained in the air to achieve a good reactivity of the acrylate polymers on the surface. The surface is slightly initially cured in the drying device with nitrogen by a UV-LED having a radiation peak at 395 nm. The droplets 4 are applied on the surface by a single-pass digital printing device with an average droplet volume of 12 pL in the subsequent processing step. Thereby, droplets of a volume of 3 pL up to 100 pL are used. The droplets are applied on the surface such that they do not or up to maximum 10% of the layer thickness of 80 μm sink into the liquid base layer. This is achieved by the initial curing of the surface with the above mentioned LED inert curing. In the example of the above-mentioned marble decor, the droplets 4 are distributed according to a digital print template, which has been created with or without digital processing from the decor image for the marble, so that the pores 6 subsequently formed by the droplets are synchronous with the underlying decor image. In this example, about 3 g/m2 area of the panel of droplet mass is applied. The surface of the panel with the droplets is then fed to a further drying station, where the entire layer structure is cured with a Hg-UV lamp with a power of 100 W/cm. Subsequently, the panel is transported into a brushing device, in which circular rotating brushes with steel bristles with a diameter of 0.2 mm per bristle remove the base layer 3 again at locations, at which the droplets 4 have been applied. The surface developed in this way is finally cured in a final drying station with a Hg-UV lamp with a power of 240 W/cm as final step.

Exemplary Embodiment 2

A HDF plate with a thickness of 10 mm, which has been printed before with a decorative image by a digital printer or by another, also analogous, printing process, is fed to a painting station and coated with a SIS base coat on an acrylate basis comprising 0.5 mass percentage Byk 3505 with a layer thickness of 60 $g/m^2$.

Said matte coat is subsequently cured on a Hg-UV lamp with, for example, 50% of the power of the exemplary embodiment 1, i.e. 50 W/cm. Following said UV lamp, the plate is again fed to a painting station where it receives an SIS base coat of, for example, 60 $g/m^2$ as an application. This is followed by curing under inert conditions, e.g. in the absence of oxygen by nitrogen flooding with an UV LED, so that said layer is cured to 50-80%, preferably 60-70%. Directly afterwards, and still under inert conditions, a masking agent with a droplet size of 12 pL per droplet is applied to the surface from a digital print head, for example with a resolution of 300 dpi. The edge angle of the 12 pL droplets applied in this way on the surface that has been initially gelled by the UV-LED under inert conditions is >70°.

Subsequently, the plate coated with the masking agent in this way with the liquid coating and the described structure to a Hg-UV lamp, which cures the unmasked fraction of the second SIS base coat coating completely, wherein the portion under the masking cures to a maximum of 70%, preferably to less than 50%. Afterwards, the HDF plate with the layer structure described above is fed to a brushing station, where a brush with copper wire brushes out the masked surface portions and removes both the masking layer and the underlying SIS base coat layer, which has not yet fully cured. Then, to determine the degree of gloss of the surface, a top coat with a different degree of gloss than the matte coat described above is applied. This may, for example, achieve a degree of gloss of 12-16 gloss points.

The last step is then the feeding of the HDF plate thus painted with top coat to a final curing, wherein the entire layer structure is finally cured with a Hg-UV lamp with more than 100 W/cm, preferably more than 150 W/cm. The feed rate for the entire package is more than 15 m/min., preferably more than 20 m/min.

In this exemplary embodiment, the matting agent used may be either pure water or comprised of substantially water as the solvent as well as other UV-absorbing agents and binders. In an alternative embodiment, the masking agent is based on acrylate varnish and also contains the corresponding UV absorbing agents. Likewise, a PP plate made of pure polypropylene or polypropylene with appropriate admixtures, e.g. filled by mineral fractions, may be used in place of the HDF plate.

In an alternative method according to the invention, the method steps of FIG. 3 may also be interchanged, individual steps may be omitted and/or individual steps may be repeated. In particular, further coating layers can be applied and partially or completely cured before and/or after step S10.

LIST OF REFERENCE SIGNS

1—first base coat
1*a*—first base coat (priming portion)
1*b*—first base coat (decor image)
2—second base coat
3—coating (base layer)
4—droplet
5—workpiece-core
6—depression (pores)
7—internal angle β
8—edge angle α
9—base coat
10—workpiece surface
11—pore for wood reproduction (from above)
12—knothole for wood reproduction (from above)
α—edge angle
$d_1$'—bulging height
$d_2$"—bulging height

The invention claimed is:

1. A method for manufacturing areas providing different degrees of hardness in a base layer (3), comprising the following steps:

step (S40): applying a masking on at least a partial area of the surface of the base layer (3), wherein the masking is configured to at least partially absorb electromagnetic radiation;

step (S50): irradiating the base layer (3) and the applied masking with electromagnetic radiation to set different degrees of hardness of the base layer (3), wherein a degree hardness gradient in x-direction as a direction in parallel to the surface of the base layer (3) between the highest degree of hardness and the lowest degree of hardness is set within a length whose extent corresponds to less than 1 mm;

wherein the base layer (3) and the masking are complementary to each other such that at least one of the following conditions is met:

(a) while performing step (S50), an edge angle (a) between the base layer (3) and the masking is achieved, which is more than 20 degrees; and (b) while performing step (S50), the height of the masking at the edge of the masking is at least 50% of the height of the masking in the center of the masking, and wherein when performing step (S40), at least a portion of the base layer (3) or the entire base layer (3) is:

liquid, or at least not already completely cured.

2. The method according to claim 1, wherein a further step (S20) is performed, in which the base layer (3) is applied on or applied with at least one of a carrier element, a further layer.

3. The method according to claim 1, wherein the masking on the surface of the base layer (3) is present in at least one of the following forms:

(a) liquid form;

(b) at least partially solidified form, or (c) the material forming the masking is applied in at least one of the following ways:

(i) in liquid form on the surface of the liquid base layer (3);

(ii) in gaseous form on the surface of the liquid base layer (3), wherein, when a condensation of the material to the masking on the surface of the base layer (3) takes place; and (iii) in the form of at least one droplet (4).

4. The method according to claim 1, further comprising a step (S30) of irradiating the base layer (3) with electromagnetic radiation in a period selected from a group consisting of before step (S40) and during step (S40) and, whereby at least one of the following properties of the base layer (3) is set to a desired value:

(a) the degree of hardness;

(b) the viscosity; and (c) the surface tension.

5. The method according to claim 1, wherein the layer thickness of the liquid base layer (3) at positions, at which the masking is applied, is reduced.

6. The method according to claim 1, wherein the surface tension of the material forming the masking is equal to or more than the surface tension of the base layer (3).

7. The method according to claim 1, wherein a difference in at least one of curing and polymerization of the base layer (3) between areas, on which the masking has been applied, and areas, on which the masking has not been applied, is present after step (S50), wherein the difference in the curing preferably corresponds to at least a factor of 2.

8. The method according to claim 1, wherein after step (S50) a step (S60) is performed, in which the masking is removed or in which the masking and the base layer (3) are removed at positions, at which the masking was applied to form at least one of depressions and through holes in the base layer (3) at said positions, wherein at least one of the following steps is performed:

(i) a member of a group consisting of the removal of the masking and the removal of the masking and the base layer (3), (ii) after step (S50) a step (S70) is performed, in which a further layer comprising a base coat is applied, and (iii) after step (S50) a step (S80) is performed, in which the entire layer structure is irradiated with electromagnetic radiation.

9. The method according to claim 1, wherein at least one of the following conditions is met:

(a) the masking is configured to absorb electromagnetic radiation, with which the base layer (3) and the applied masking in step (S50) are irradiated, by at least 60%, (b) the masking is configured to absorb electromagnetic radiation, whose wavelength falls below a threshold wavelength, (c) the irradiation in step (S50) is carried out with electromagnetic radiation, whose wavelength falls below the threshold wavelength, and (d) the masking is configured to at least let electromagnetic radiation providing a predetermined minimum wavelength pass.

10. The method according to claim 1, wherein at least one of the following conditions is met:

(a) the masking is configured to absorb electromagnetic radiation, with which the base layer (3) and the applied masking in step (S50) are irradiated, by at least 60%, (b) the masking is configured to absorb electromagnetic radiation, which wavelength exceeds a threshold wavelength, (c) the irradiation in step (S50) is carried out with electromagnetic radiation, which wavelength exceeds the threshold wavelength, and (d) the masking is configured to at least let electromagnetic radiation providing a predetermined maximum wavelength pass.

11. The method according to claim 1, wherein the masking is applied such that it runs at least in partial areas synchronously to a décor image, which is already on or in the base layer (3) or which has been added subsequently to the base layer (3) or a workpiece comprising the base layer (3).

12. The method according to claim 1, wherein the masking at least partially remains on the base layer (3).

13. The method according to claim 1, wherein the base layer (3) and the applied masking are irradiating with at least one of UV radiation and IR radiation to set different degrees of hardness of the base layer (3).

14. The method according to claim 3, wherein the material forming the masking is applied on the base layer (3) in the form of at least one droplet (4) with a volume of less than 1 nL.

15. The method according to claim 4, wherein a viscosity gradient or hardness gradient in the base layer (3), such that the side of the base layer (3) facing away from the radiation source of the electromagnetic radiation provides a viscosity or hardness less than the side of the base layer (3) facing towards the radiation source, or a changed surface tension is developed by irradiation of the liquid base layer (3) with electromagnetic radiation in step (S30).

16. The method according to claim 5, wherein the reduction of the layer thickness is carried out at least one of by sinking of the masking into the base layer (3) and by displacement of the base layer (3) by the masking.

17. The method according to claim 9, wherein, when the masking is configured to at least let electromagnetic radiation providing a predetermined minimum wavelength pass, the irradiation in step (S50) with electromagnetic radiation is carried out such that electromagnetic radiation is used which only provides radiation with wavelengths, which are below the minimum wavelength.

18. The method according to claim 10, wherein, when the masking is configured to at least let electromagnetic radiation providing a predetermined maximum wavelength pass, the irradiation in step (S50) with electromagnetic radiation is carried out such that electromagnetic radiation is used which only provides radiation with wavelengths, which are above the maximum wavelength.

* * * * *